(12) United States Patent
Chang

(10) Patent No.: US 9,971,199 B2
(45) Date of Patent: May 15, 2018

(54) LIQUID CRYSTAL DISPLAY PANEL AND LIQUID CRYSTAL DISPLAY DEVICE

(71) Applicant: Shenzhen China Star Optoelectronics Technology Co., Ltd., Shenzhen, Guangdong (CN)

(72) Inventor: Jianyu Chang, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 24 days.

(21) Appl. No.: 15/100,657

(22) PCT Filed: May 20, 2016

(86) PCT No.: PCT/CN2016/082808
§ 371 (c)(1),
(2) Date: Jun. 1, 2016

(87) PCT Pub. No.: WO2017/193416
PCT Pub. Date: Nov. 16, 2017

(65) Prior Publication Data
US 2017/0322454 A1   Nov. 9, 2017

(30) Foreign Application Priority Data

May 9, 2016 (CN) .......................... 2016 1 0303717

(51) Int. Cl.
*G02F 1/133* (2006.01)
*G02F 1/1335* (2006.01)
*F21V 8/00* (2006.01)

(52) U.S. Cl.
CPC ....... *G02F 1/133621* (2013.01); *G02B 6/004* (2013.01); *G02B 6/0055* (2013.01);
(Continued)

(58) Field of Classification Search
CPC ................................................ G02F 1/133621
See application file for complete search history.

(56) References Cited

U.S. PATENT DOCUMENTS

| | | | |
|---|---|---|---|
| 2004/0125278 A1* | 7/2004 | Park ................. | G02F 1/133514 349/106 |
| 2004/0155996 A1* | 8/2004 | Chen ................. | G02F 1/133615 349/65 |

(Continued)

FOREIGN PATENT DOCUMENTS

| | | |
|---|---|---|
| CN | 102681247 A | 9/2012 |
| CN | 202649645 U | 1/2013 |

(Continued)

*Primary Examiner* — James Dudek
(74) *Attorney, Agent, or Firm* — Andrew C. Cheng

(57) ABSTRACT

The invention provides a liquid crystal display panel and a liquid crystal display device. The liquid crystal display device includes a liquid crystal display panel and an edge-lit backlight module. The liquid crystal display panel includes multiple pixel units arranged in an array and having equal areas. Each pixel unit includes sequentially arranged red sub-pixel, green sub-pixel and blue sub-pixel. Transmittances of blue light of the blue sub-pixels of the pixel units are gradually increased along a direction away from a side-type backlight source of the edge-lit backlight module. Therefore, the invention can increase transmittances of blue light of the blue sub-pixels, compensate the influence of color shift caused by blue light being absorbed in the backlight module and reduce color difference of the liquid crystal display panel.

6 Claims, 3 Drawing Sheets

Direction of light propagation

(52) U.S. Cl.
CPC ............... *G02B 6/0088* (2013.01); *G02F 2001/133622* (2013.01); *G02F 2202/28* (2013.01); *G02F 2203/01* (2013.01)

(56) References Cited

U.S. PATENT DOCUMENTS

| | | | |
|---|---|---|---|
| 2013/0286324 A1* | 10/2013 | Huang | G02F 1/133605 349/61 |
| 2014/0133176 A1 | 5/2014 | Hu et al. | |
| 2014/0176867 A1* | 6/2014 | Huang | G02B 6/0081 349/65 |
| 2015/0263077 A1 | 9/2015 | Kim et al. | |

FOREIGN PATENT DOCUMENTS

| | | |
|---|---|---|
| CN | 204986686 U | 1/2016 |
| JP | 2007094025 A | 4/2017 |
| TW | 200516294 A | 5/2005 |

\* cited by examiner

LIQUID CRYSTAL DISPLAY PANEL AND LIQUID CRYSTAL DISPLAY DEVICE

TECHNICAL FIELD

The invention relates to the field of display technology, and particularly to a liquid crystal display panel and a liquid crystal display device.

DESCRIPTION OF RELATED ART

Backlight modules of LCD (liquid crystal display) devices, based on different light entering manners, can be classified into two kinds of edge-lit type and direct type.

A liquid crystal display panel is an important part of the LCD device and uses the color-mixing principle of three primary colors of red (R), green (G) and blue (B). In the prior art, in order to ensure the overall viewing experience of the LCD device, a color difference of the liquid crystal display panel usually is required to be smaller than a value, so that the user would not perceive the problem of color shift on subjective feeling. The problem of color shift occurred in the conventional LCD device usually is caused by the backlight module, for example, as far as the edge-lit backlight module is concerned, light is propagated within a light guide plate so as to achieve uniform light mixing by use of the characteristic of total reflection within the light guide plate, and therefore the light guide plate is the main reason of causing the color shift of LCD device. This is because that: the light guide plate has inconsistent light absorption at visible wavelengths and the absorption of blue light usually is relatively strong, so that along the direction of light propagation, the absorbed blue light is continuously increased, resulting in the chromaticity of light on the direction of propagation of the light guide plate is changed, and finally a serious color difference is occurred in the liquid crystal display panel. That is, the conventional liquid crystal display panel, on the direction of light propagation, easily appears bluish at a side near the light source and appears yellowish at a side away from the light source, and therefore would not meet specification requirement.

SUMMARY

Accordingly, the invention proposes a liquid crystal display panel and a liquid crystal display device, which can improve transmittance of blue light of the liquid crystal display panel, compensate the influence of color shift caused by blue light being absorbed in a backlight module and reduce color difference of the liquid crystal display panel.

A first aspect of the invention provides a liquid crystal display panel. The liquid crystal display panel is adapted for being used in conjunction with a side-type backlight source and includes multiple (i.e., more than one) pixel units arranged in an array. Each of the pixel units includes sequentially arranged a red sub-pixel, a green sub-pixel and a blue sub-pixel. The pixel units each have a same area, and along a direction away from the side-type backlight source, light transmittances of the blue sub-pixels of the pixel units are gradually increased.

In an embodiment, along the direction away from the side-type backlight source, areas of the blue sub-pixels of the pixel units are gradually increased.

In an embodiment, along the direction away from the side-type backlight source, areas of the blue sub-pixels of the pixel units are the same while blue photoresists corresponding to the blue sub-pixels of the pixel units are gradually thinned.

A second aspect of the invention provides a liquid crystal display device including a liquid crystal display panel and an edge-lit backlight module. The edge-lit backlight module includes a side-type backlight source. The liquid crystal display panel includes multiple pixel units arranged in an array. The pixel units each include sequentially arranged red sub-pixel, green sub-pixel and blue sub-pixel. Areas of the pixel units are equal, and along a direction away from the side-type backlight source, areas of the blue sub-pixels of the pixel units are gradually increased. The edge-lit backlight module further includes an aluminum extrusion and a light guide plate. The aluminum extrusion includes an aluminum extrusion vertical plate, and the side-type backlight source is disposed on an inner sidewall of the aluminum extrusion vertical plate. The light guide plate has a light incident surface and a light exit surface, and the light incident surface is disposed facing toward the side-type backlight source.

In an embodiment, a surface of the light guide plate facing away from the light exit surface is provided with multiple dots.

In an embodiment, the edge-lit backlight module further includes a TIR (Total Internal Reflection) lens, and the TIR lens is disposed on the light exit surface of the light guide plate.

In an embodiment, the edge-lit backlight module further includes: an optical film set, disposed above the light guide plate and facing toward the light exit surface of the light guide plate; a plastic frame, disposed outside of the aluminum extrusion; and an adhesive strip, disposed in at least a part of a region between the aluminum extrusion and the plastic frame and for securing the plastic frame and the aluminum extrusion.

A third aspect of the invention provides a liquid crystal display device including a liquid crystal display panel and an edge-lit backlight module. The edge-lit backlight module includes a side-type backlight source. The liquid crystal display panel includes multiple pixel units arranged in an array. Each of the pixel units includes sequentially arranged red sub-pixel, green sub-pixel and blue sub-pixel. The pixel units each have a same area, and along a direction away from the side-type backlight source, light transmittances of the blue sub-pixels of the pixel units are gradually increased.

In an embodiment, along the direction away from the side-type backlight source, areas of the blue sub-pixels of the pixel units are gradually increased.

In an embodiment, along the direction away from the side-type backlight source, areas of the blue sub-pixels of the pixel units are the same while blue photoresists corresponding to the blue sub-pixels are gradually thinned.

In an embodiment, the edge-lit backlight module further includes: an aluminum extrusion including an aluminum extrusion vertical plate, wherein the side-type backlight source is disposed on an inner sidewall of the aluminum extrusion vertical plate; and a light guide plate having a light incident surface and a light exit surface, wherein the light incident surface faces toward the side-type backlight source.

In an embodiment, a surface of the light guide plate facing away from the light exit surface is formed with multiple dots.

In an embodiment, the edge-lit backlight module further includes a TIR lens, and the TIR lens is disposed on the light exit surface of the light guide plate.

In an embodiment, the edge-lit backlight module further includes: an optical film set, disposed above the light guide plate and facing toward the light exit surface of the light guide plate; a plastic frame, disposed outside of the aluminum extrusion; and an adhesive strip, disposed in at least a part of the region between the aluminum extrusion and the plastic frame and for securing the plastic frame and the aluminum extrusion.

By adopting the above solutions, efficacy can be achieved by the invention is that: distinguishing from the prior art, the liquid crystal display device according to the invention includes a liquid crystal display panel and an edge-lit backlight module, blue sub-pixels of the liquid crystal display panel are configured as that light transmittances of the blue sub-pixels are gradually increased along a direction away from the side-type backlight source, so that blue light transmittance of the blue sub-pixels are increased, the influence of color shift caused by blue light being absorbed in the backlight module is compensated, and in-plane color difference of the LCD device can be reduced.

DETAILED DESCRIPTION OF EMBODIMENTS

In order to make technical problems to be solved, technical solutions and beneficial effects of the invention be more clear and apparent, in the following, in conjunction with accompanying drawings and embodiments, the invention will be further described in detail. It should be understood that, specific embodiments described herein are merely to illustrate the invention and not intended to limit the invention.

Figure 1:
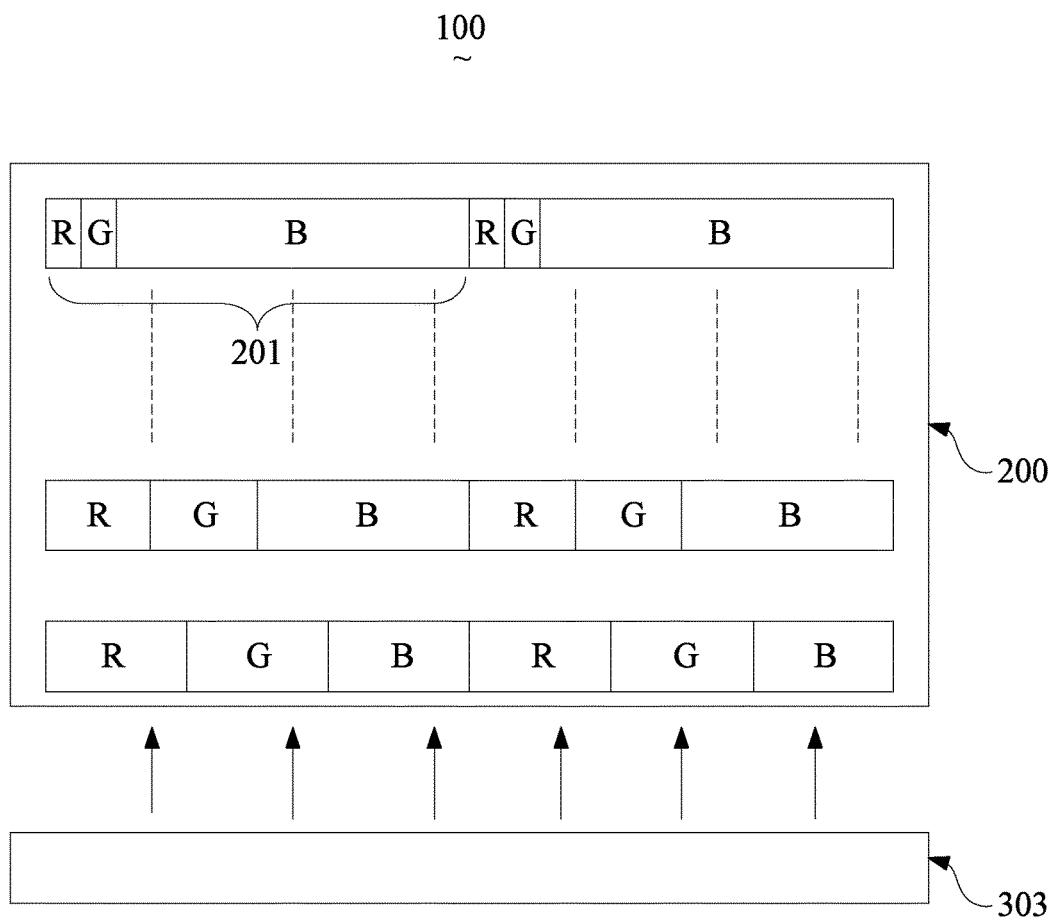
FIG. 1 is a schematic structural top view of a liquid crystal display device according to an embodiment of the invention.

Referring to FIG. 1, which is a schematic structural top view of a liquid crystal display device according to an embodiment of the invention. As illustrated in FIG. 1, the liquid crystal display device 100 of the present embodiment includes a liquid crystal display panel 200 and a side-type backlight source 303. The side-type backlight source 303 is disposed at a side of the liquid crystal display panel 200 and for providing a light source to the liquid crystal display panel 200. The illustration of FIG. 1 is the top view of the side-type backlight source 303 and the liquid crystal display panel 200. Moreover, the liquid crystal display panel 200 includes multiple (i.e., more than one) pixel units 201 arranged in an array. The pixel units 201 each have a same area. Each of the pixel units 201 includes sequentially arranged red sub-pixel R, green sub-pixel G and blue sub-pixel B. In each pixel unit 201, the red sub-pixel R, the green sub-pixel G and the blue sub-pixel B are arranged along the horizontal direction in a same order. Along a direction away from the side-type backlight source 303 (i.e., direction of light propagation), light transmittances of the blue sub-pixels B are gradually increased. As illustrated in FIG. 1, along the direction of light propagation, each pixel unit 201 of the liquid crystal display panel 200 has a same area, areas of the blue sub-pixels B are gradually increased, and further the red sub-pixel R and the green sub-pixel G in a same pixel unit 201 are equal, so that along with the areas of the blue sub-pixels B being gradually increased, area ratios of the pixel units 201 occupied by the respective red sub-pixels R and green sub-pixels G are gradually decreased correspondingly.

Figure 2:
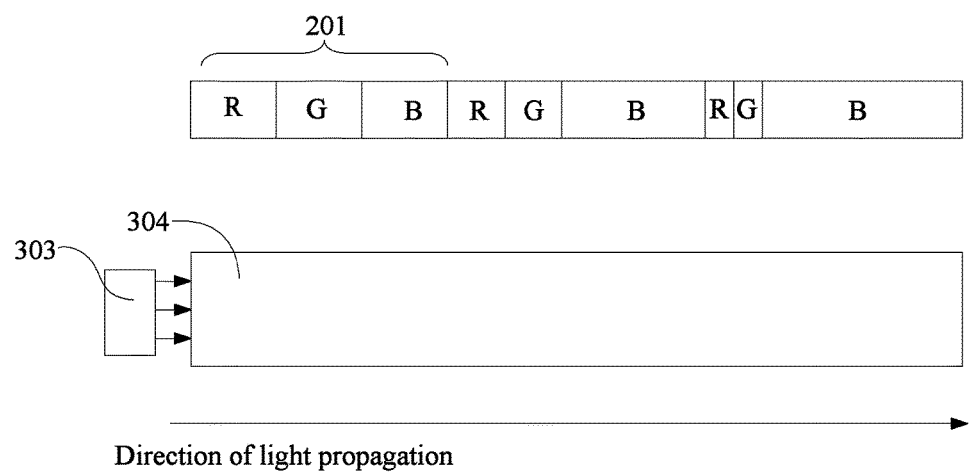
FIG. 2 is a schematic structural sectional view of the liquid crystal display device in FIG. 1.

Referring FIG. 2, which is a schematic structural sectional view of the liquid crystal display device in FIG. 1. As illustrated in FIG. 2, the side-type backlight source 303 is disposed at a side of a light guide plate 304, each pixel unit 201 includes a red sub-pixel R, a green sub-pixel G and a blue sub-pixel B sequentially arranged in an order, each pixel unit 201 has a same area, the red sub-pixel R, the green sub-pixel G and the blue sub-pixel B thereof are arranged along the horizontal direction in a same order, and along the direction of light propagation, areas of the blue sub-pixels B are gradually increased.

Accordingly, as to the liquid crystal display panel 200 according to the present embodiment, by gradually increasing the areas of the blue sub-pixels B along the direction of light propagation and correspondingly decreasing the areas of the red sub-pixels R and the green sub-pixels G, light transmittances of the blue sub-pixels G are increased, the phenomenon of the liquid crystal display panel 200 appearing bluish at the side near the light source while appearing yellowish at the side away from the light source caused by blue light being absorbed in the backlight module 300 is compensated, and the color difference of the liquid crystal display panel 200 is reduced.

Figure 3:
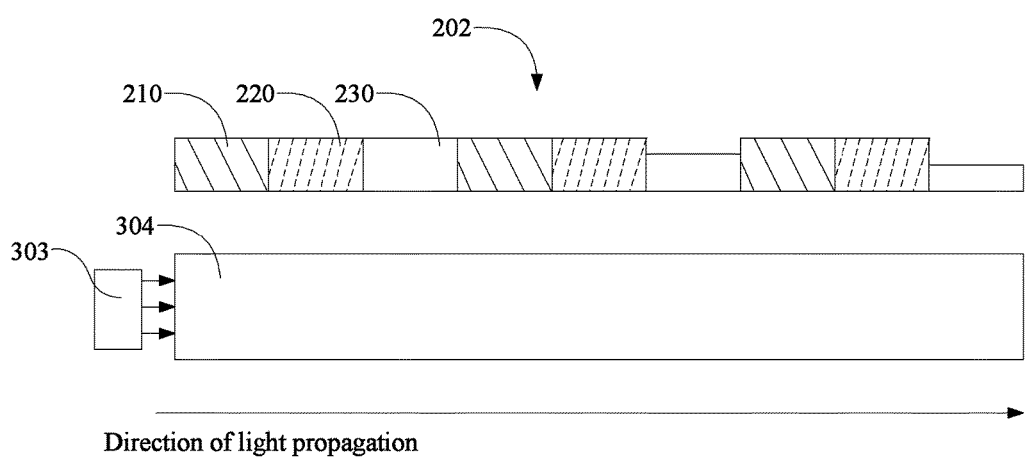
FIG. 3 is a schematic structural sectional view of a liquid crystal display device according to another embodiment of the invention.

Referring to FIG. 3, which is a schematic structural sectional view of a liquid crystal display device according to another embodiment of the invention. As illustrated in FIG. 3, the liquid crystal display device 100 includes a side-type backlight source 303, a light guide plate 304 and a color filter 202. The side-type backlight source 303 is disposed at a side of the light guide plate 304. The color filter 202 includes a red photoresist 210, a green photoresist 220 and a blue photoresist 210. Along a direction of light propagation, each pixel unit (not labeled in FIG. 3) has a same area, the blue sub-pixels are kept with same areas while the blue photoresists 230 corresponding to the blue sub-pixels B are gradually thinned. Therefore, the illustrated embodiment makes the blue photoresists 230 corresponding to the blue sub-pixels B be gradually thinned along the direction of light propagation, so that light transmittances of the blue sub-pixels B can be increased, the phenomenon of the liquid crystal display panel 200 appearing bluish at the side near the light source and appearing yellowish at the side away from the light source caused by blue light being absorbed in the backlight module 300 can be compensated, and the color difference of the liquid crystal display panel 200 can be reduced.

Figure 4:
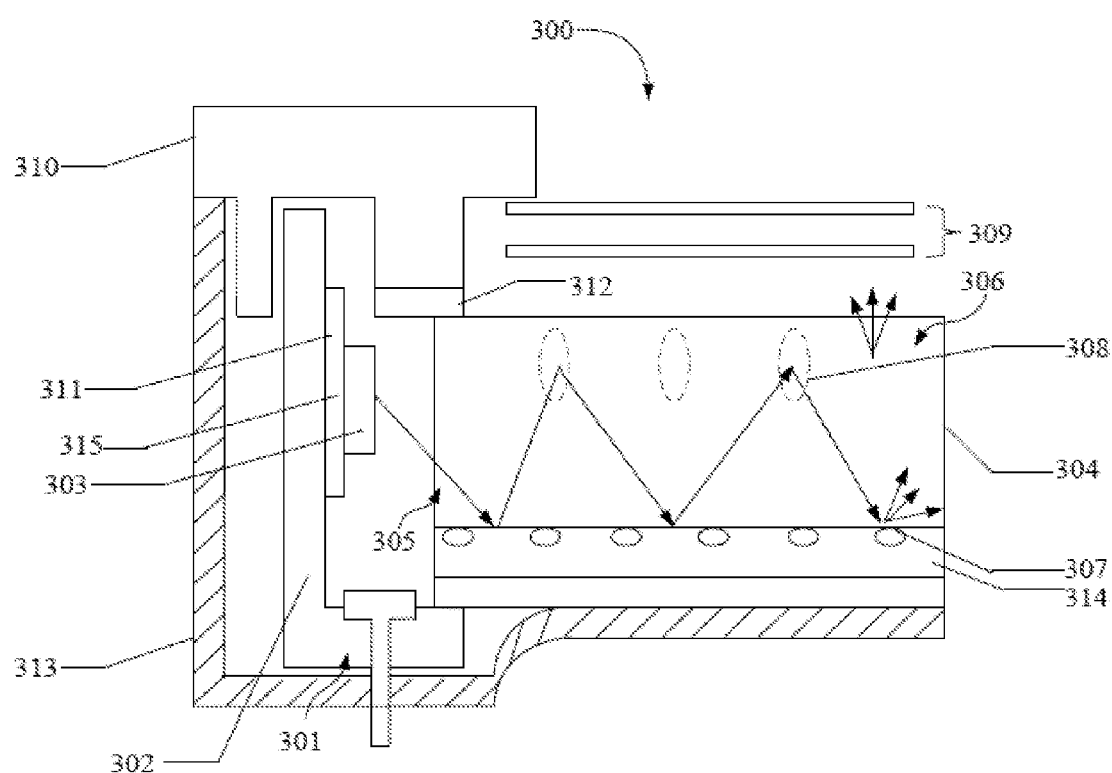
FIG. 4 is a schematic structural view of the edge-lit backlight module in FIG. 1.

Referring to FIG. 4, which is a schematic structural view of the edge-lit backlight module in FIG. 1. As illustrated in FIG. 4, the edge-lit backlight module 300 includes an aluminum extrusion 301, the side-type backlight source 303 and the light guide plate 304.

The aluminum extrusion 301 includes an aluminum extrusion vertical plate 302 as at least a part thereof.

The side-type backlight source 303 is disposed on an inner sidewall of the aluminum extrusion vertical plate 302, and the side-type backlight source 303 includes but is not limited to LED (light emitting diode).

The light guide plate 304 has a light incident surface 305 and a light exit surface 306. The light incident surface 305 of the light guide plate 304 is disposed facing toward the side-type backlight source 303, a surface of the light guide plate 304 facing away from the light exit surface 306 is provided with multiple dots 307. The dots 307 of the light guide plate 304 usually are formed by that a laser dotting method is used to form concave points on a surface of the light guide plate 304 as the dots 307.

Furthermore, the light exit surface 306 of the light guide plate 304 is disposed with multiple TIR (total internal reflection) lenses 308, so as to facilitate light rays outputted from the light exit surface 306 of the light guide plate 304 to carry out total internal reflection via the TIR lenses 308 and the utilization of light can be improved as a result.

In addition, a reflective film 314 is disposed below the light guide plate 304, and the reflective film 314 concretely is disposed on a surface of the light guide plate formed with the dots 307. In the illustrated embodiment, a propagation principle in the light guide plate 304 of light rays emitted from the side-type backlight source 303 is that: the light rays emitted from a LED lamp of the side-type backlight source 303 enter into the light guide plate 304 from the light incident surface 305 and then are reflected to the TIR lenses 308 by the reflective film 314, afterwards the TIR lenses 308 make the light rays to carry out total internal reflection and the dots 307 of the light guide plate 304 would break the total internal reflection, and finally the light rays exit out from the light exit surface 306 of the light guide plate 304.

Moreover, the edge-lit backlight module 300 in the illustrated embodiment further includes: an optical film set 309 and a plastic frame 310.

The optical film set 309 is disposed above the light guide plate 304 and facing toward the light exit surface 306 of the light guide plate 304.

The plastic frame 310 is disposed outside of the aluminum extrusion 301 and covering peripheral edges of the optical film set 309. At least a part of the region between the aluminum extrusion 301 and the plastic frame 310 is disposed with an adhesive strip (not shown in the drawings), and the adhesive strip is used for securing the plastic frame 310, the aluminum extrusion 301 and other optical component(s) (not shown in the drawings).

Further, the edge-lit backlight module 300 includes: a back plate 313, a printed circuit board (PCB) 315 and a reflective sheet 312.

The back plate 313 is for supporting the plastic frame 310, the aluminum extrusion 301 and other optical component(s).

The printed circuit board 315 is disposed on the inner sidewall of the aluminum extrusion vertical plate 302 and for providing the side-type backlight source 303 with electrical energy. The side-type backlight source 303 is disposed on the printed circuit board 315.

The reflective sheet 312 is disposed in a gap between the light exit surface 306 of the light guide plate 304 and the side-type backlight source 303 and for reflecting light emitted from the side-type backlight source 303 to the light guide plate 304.

It should be noted that, the edge-lit backlight module 300 may include other optical component(s) not shown in the drawings.

In summary, distinguishing from the prior art, the liquid crystal display device associated with the invention includes a liquid crystal display panel and an edge-lit backlight module, the edge-lit backlight module includes a side-type backlight source, the liquid crystal display panel includes multiple pixel units arranged in an array and having equal areas, each of the pixel units includes sequentially arranged red, green and blue sub-pixels, and along the direction away from the side-type backlight source, light transmittances of the blue sub-pixels are gradually increased, and therefore the invention can increase blue light transmittances of the blue sub-pixels, compensate the influence of color shift caused by blue light being absorbed in the edge-lit backlight module, and reduce the color difference of the liquid crystal display panel.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal display panel, wherein the liquid crystal display panel is adapted for being used in conjunction with a side-type backlight source and comprises a plurality of pixel units arranged in an array, each of the plurality of pixel units comprises a red sub-pixel, a green sub-pixel and a blue sub-pixel sequentially arranged in an order, the plurality of pixel units have equal areas, and light transmittances of the blue sub-pixels of the plurality of pixel units are gradually increased along a direction away from the side-type backlight source, wherein along the direction away from the side-type backlight source, areas of the blue sub-pixels of the plurality of pixel units are the same while blue photoresists corresponding to the blue sub-pixels are gradually thinned.

2. A liquid crystal display device comprising a liquid crystal display panel and an edge-lit backlight module; wherein the edge-lit backlight module comprises a side-type backlight source, the liquid crystal display panel comprises a plurality of pixel units arranged in an array, each of the plurality of pixel units comprises a red sub-pixel, a green sub-pixel and a blue sub-pixel sequentially arranged in an order, areas of the plurality of pixel units are equal, and areas of the blue sub-pixels of the plurality of pixel units are gradually increased along a direction away from the side-type backlight source, wherein along the direction away from the side-type backlight source, areas of the blue sub-pixels of the plurality of pixel units are the same while blue photoresists corresponding to the blue sub-pixels are gradually thinned.

3. The liquid crystal display device as claimed in claim 2, wherein the edge-lit backlight module further comprises:
an aluminum extrusion including an aluminum extrusion vertical plate, the side-type backlight source being disposed on an inner sidewall of the aluminum extrusion vertical plate;
a light guide plate, having a light incident surface and a light exit surface, the light incident surface being disposed facing toward the side-type backlight source.

4. The liquid crystal display device as claimed in claim 3, wherein a surface of the light guide plate facing away from the light exit surface is formed with a plurality of dots.

5. The liquid crystal display device as claimed in claim 4, wherein the edge-lit backlight module further comprises a TIR lens, and the TIR lens is disposed on the light exit surface of the light guide plate.

6. The liquid crystal display device as claimed in claim 3, wherein the edge-lit backlight module further comprises:
an optical film set, disposed above the light guide plate and facing toward the light exit surface of the light guide plate;
a plastic frame, disposed outside of the aluminum extrusion;

an adhesive strip, disposed in at least a part of a region between the aluminum extrusion and the plastic frame and for securing the plastic frame and the aluminum extrusion.

* * * * *